United States Patent
Sekine

(10) Patent No.: US 9,712,770 B2
(45) Date of Patent: Jul. 18, 2017

(54) IMAGE SENSOR

(71) Applicant: NLT TECHNOLOGIES, LTD., Kawasaki, Kanagawa (JP)

(72) Inventor: Hiroyuki Sekine, Kawasaki (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 15/135,941

(22) Filed: Apr. 22, 2016

(65) Prior Publication Data

US 2016/0316161 A1 Oct. 27, 2016

(30) Foreign Application Priority Data

Apr. 24, 2015 (JP) ................... 2015-089401

(51) Int. Cl.
| | |
|---|---|
| *H04N 5/357* | (2011.01) |
| *H04N 5/374* | (2011.01) |
| *H04N 5/369* | (2011.01) |
| *H04N 5/32* | (2006.01) |

(52) U.S. Cl.
CPC ......... *H04N 5/3698* (2013.01); *H04N 5/3575* (2013.01); *H04N 5/3741* (2013.01); *H04N 5/32* (2013.01)

(58) Field of Classification Search
CPC .. H04N 5/3698; H04N 5/3575; H04N 5/3741; H04N 5/32
USPC ..... 348/308, 294, 296, 301, 367; 250/208.1; 257/291, 292; 438/199
See application file for complete search history.

(56) References Cited

U.S. PATENT DOCUMENTS

| | | | |
|---|---|---|---|
| 5,831,258 A | 11/1998 | Street | |
| 7,274,009 B2 * | 9/2007 | Huang | H01L 27/14643 250/208.1 |
| 8,816,285 B2 * | 8/2014 | Katoh | G06F 3/0412 250/349 |
| 2005/0269610 A1 * | 12/2005 | Hiyama | H04N 3/155 257/292 |
| 2006/0001752 A1 * | 1/2006 | Yanagisawa | H04N 5/363 348/308 |
| 2008/0067325 A1 * | 3/2008 | Tani | H04N 3/1512 250/208.1 |
| 2009/0057536 A1 * | 3/2009 | Hirose | G01J 1/04 250/208.1 |
| 2009/0207289 A1 * | 8/2009 | Masuyama | H04N 3/1568 348/300 |

(Continued)

FOREIGN PATENT DOCUMENTS

| | | |
|---|---|---|
| JP | 1-184954 A | 7/1989 |
| JP | 4-206573 A | 7/1992 |

(Continued)

*Primary Examiner* — Tuan Ho
*Assistant Examiner* — Marly Camargo
(74) *Attorney, Agent, or Firm* — Sughrue Mion, PLLC

(57) ABSTRACT

As a control signal used for resetting a photodiode, a control signal for selecting an adjacent pixel row is used. Accordingly, the number of kinds of used control signals decreases, and a decrease in the area of the photodiode is prevented. In addition, a period in which all of a plurality of control signals selecting an adjacent pixel row are active is provided by setting an active period of a control signal selecting a pixel row to a period longer than a period in which a signal of one pixel row is read. Therefore, a CDS operation is realized.

6 Claims, 14 Drawing Sheets

(56) References Cited

U.S. PATENT DOCUMENTS

2012/0002090 A1* 1/2012 Aoki .................... G09G 3/3413
348/297

FOREIGN PATENT DOCUMENTS

| JP | 10-108074 A | 4/1998 |
| JP | 10-108075 A | 4/1998 |
| JP | 11-211832 A | 8/1999 |

* cited by examiner

IMAGE SENSOR

CROSS-REFERENCE TO RELATED APPLICATIONS

This non-provisional application claims priority under 35 U.S.C.§119(a) on Patent Application No. 2015-89401 filed in Japan on Apr. 24, 2015, the entire contents of which are hereby incorporated by reference.

TECHNICAL FIELD

The present invention relates to an image sensor, and more particularly, to an image sensor having an amplifier circuit arranged in each pixel.

BACKGROUND

Technologies for inspecting the inside of an inspection target based on an X-ray projected image in a non-destructive manner are technologies that are essential in a medical field, an industrial nondestructive inspection field, and the like. Particularly, an X-ray image sensor that directly takes in an X-ray projected image as electronic data is widely used owing to a speedy imaging process, image reading support using image processing, applicability to a moving image, and the like. As such an X-ray image sensor, a device called flat panel detector (FPD) is mainly used. This is one type of metal-oxide semiconductor (MOS) type image sensor. In the FPD, in each of pixels that are two-dimensionally arranged, a photoelectric conversion section converting an X ray into electric charge and a switching device taking out signal electric charge accumulated in the photoelectric conversion section to the outside are arranged. The FPD is prepared on a substrate formed of glass having a large area or the like by using a thin film semiconductor technology. The reason for this is that a reduction optical system capable of responding to the X ray cannot be easily produced, and thus, the size of the FPD needs to be equal to or more than that of an inspection target. Thus, as a switching device arranged in each pixel, a thin film transistor (TFT) is used.

Regarding the FPD, as systems converting an X ray into electric charge, there are two systems when largely divided. One is an indirect conversion system converting an X ray into visible light and converting the converted visible light into electric charge. The other one is a direct conversion system directly converting an X ray into electric charge. A conventional example of the FPD of the indirect conversion system is disclosed in FIG. 5 of Japanese Patent Application Laid-Open No. 4-206573. This FPD has a structure in which a phosphor layer is stacked on a formation part of a photodiode and a transistor through an insulating film. According to the radiation of an X ray, the phosphor layer emits visible light, and the emitted visible light is converted into electric charge using the photodiode. In Japanese Patent Application Laid-Open No. 4-206573, an example is disclosed in which a photodiode and a transistor are formed using amorphous silicon (a-Si). On the other hand, a conventional example of an FPD of the direct conversion type is disclosed in FIG. 1 of Japanese Patent Application Laid-Open No. 11-211832. This FPD has a structure in which pixels each having a photoconductive layer connected to a transistor are formed on a substrate. An X ray is absorbed by the photoconductive layer and is directly converted into electric charge. Japanese Patent Application Laid-Open No. 11-211832 discloses a method using ZnO, CdS, CdSe, or the like as a photoconductive layer. In FPDs of the two systems described above, a signal is output as electric charge, is converted into a voltage by a signal detecting circuit such as an integrator disposed outside, and is formed as a digital signal. The FPD represented here outputs signal electric charge acquired by each pixel, and the signal electric charge is not amplified within the pixel. Thus, there is a possibility that the FPD is classified as a passive-pixel sensor (PPS).

Recently, in a medical field, an X-ray diagnostic apparatus is strongly requested to provide low radiation exposure and high definition. In a case where an X ray radiation amount is decreased for low radiation exposure, signal electric charge detected by the FPD is decreased, whereby the S/N ratio is degraded. In addition, in a case where the pixel size of the FPD is decreased for high definition, signal electric charge is decreased according to a decrease in the pixel size, whereby the S/N ratio is degraded. In other words, in order to achieve both the low radiation exposure and the high definition, it is essential to raise the S/N ratio of the FPD.

As a technology for realizing a high S/N ratio in an image sensor, there is a technology called active-pixel sensor (APS) that is applied to a CMOS image sensor. In this technology, in each pixel of an image sensor, an amplifier circuit is provided in addition to a photoelectric conversion device such as a photodiode, a signal of the photoelectric conversion device is amplified, and the amplified signal is output. According to this technology, high definition of an image sensor can be realized without degrading the S/N ratio of a signal. Generally, while a CMOS image sensor is integrated on a single-crystal Si substrate and is mainly used for an optical camera and the like, there are attempts for applying such an APS technology to a thin film semiconductor. For example, there is a method disclosed in Japanese Patent Application Laid-Open No. 1-184954.

However, in order to apply the APS to the thin film semiconductor, a means that corrects a threshold voltage variation of the TFT is essential. For example, in a case where polycrystalline Si TFT is used as a thin film semiconductor, there is a problem in that in-plane variations of the threshold voltage are very large. These variations are intrinsic problems due to variations in the grain size of polycrystalline Si and the like. On the other hand, in a case where a-Si TFT is used for the amplification of a signal, owing to an amorphous structure, a problem of variations of the threshold voltage due to the crystal structure of a polycrystalline Si TFT or the like does not occur. However, a problem relating to the reliability occurs. The problem is that the threshold voltage varies much in a case where a voltage is continued to be applied between the gate and the source of an a-Si TFT. In a TFT used for an amplifier circuit, a voltage causing the TFT to be constantly in a conductive state is continuously applied between the gate and the source. For this reason, a threshold voltage of the TFT for an amplifier circuit varies, and an output voltage varies according to the variation of the threshold voltage as well. This problem relating to the reliability similarly occurs also in TFTs using amorphous oxide semiconductor.

As a means that corrects output variations of pixels accompanied with such threshold variations of TFTs, several methods have been proposed.

One method is disclosed in Japanese Patent Application Laid-Open No. 10-108075. According to this method, before an image sensor starts to operate, a reference voltage is supplied to an amplification TFT of each pixel. Then, output variations in the case of supplying the reference voltage are maintained in a memory or the like, and a variation component is eliminated from a detected signal at the time of the operation. However, in this method, there is a problem in that the dynamic range of a detection circuit detecting a signal of an image sensor needs to be set to be very large. For example, in a case where a polycrystalline Si is used as the thin film semiconductor, a threshold voltage variation of the TFT may be 1 V or more. In a case where it is considered that the amplitude of the output voltage of an image sensor is about 1 V, this means that the dynamic range of the detection circuit needs to be set to be twice or more. To set the dynamic range twice or more with the precision and the operating speed of the detection circuit being maintained makes it difficult to design the detection circuit, which leads to an increase in the manufacturing cost.

In another method, a technology called correlated double sampling (CDS) is used. According to this technology, an offset voltage error of the amplifier circuit is eliminated by taking a difference between an output voltage including a signal component of an image sensor and an output voltage after resetting the photodiode. An example in which this technology is applied to an MOS-type image sensor is illustrated in FIG. 1. FIG. 1 is a circuit diagram that illustrates a circuit 200 corresponding to one pixel and a signal processing circuit 600 performing CDS. The pixel 200 is one pixel of an image sensor and is configured by a photodiode 210, an amplification transistor 220, a selection transistor 230, and a reset transistor 240. A source terminal of the selection transistor 230 is connected to a signal line Dm. A load resistor 310 is connected to each signal line. In a case where the selection transistor 230 is in a conductive state, a source follower circuit is configured by the amplification transistor 220 and the load resistor 310. The signal processing circuit 600 is configured by an initial-stage amplifier 610, a switch 620, a switch 621, a capacitor 630, a capacitor 631, and a differential amplifier 611.

The operation of the CDS will be described using a timing diagram illustrated in FIG. 2. At time t0, a selection signal Gn becomes a high level, and the selection transistor 230 becomes a conductive state. Accordingly, the electric potential of the source of the amplification transistor 220 is output as the electric potential of both ends of the load resistor 310 disposed at the signal line Dm. At time t1, a control signal $\phi 1$ becomes the high level, and the switch 620 becomes a conductive state. At time t2, the control signal $\phi 1$ changes to a low level, and the switch 620 becomes a non-conductive state. Accordingly, a voltage V1 of the load resistor 310 at time t2 is maintained at the capacitor 630. At time t3, a reset control signal Rn becomes the high level, and the reset transistor 240 becomes the conductive state. Accordingly, the electric potential of a cathode of the photodiode 210 is reset to VBP. At time t4, a control signal $\phi 2$ becomes the high level, and the switch 621 becomes the conductive state. At time t5, the control signal $\phi 2$ is changed to a low level, and the switch 621 becomes a non-conductive state. Accordingly, the voltage V1 of the load resistor 310 at time t5 is maintained at the capacitor 631.

Here, it is assumed that the voltage amplification factor of each of the initial-stage amplifier 610 and the differential amplifier 611 is one. In a case where the cathode voltage Vpc of the photodiode 210 at time t2 is Vsig, the voltage V1 becomes $\alpha \cdot$Vsig–Vof, and this voltage is maintained at the capacitor 630. At time t5, since the cathode voltage of the photodiode 210 is reset to VBP, the voltage V1 becomes $\alpha \cdot$VBP–Vof. Since this voltage is maintained at the capacitor 631, the output V4 of the differential amplifier 611 becomes $\alpha$(Vsig–VBP). Here, a is a voltage amplification factor of the source follower circuit that is configured by the amplification transistor 220 and the load resistor 310, and Vof is an offset voltage. The offset voltage Vof is a value that depends on the threshold voltage of the amplification transistor 220. In a case where the threshold voltages of the amplification transistors 220 of pixels vary, the offset voltages Vof vary as well. However, in a case where a CDS operation is performed, the offset voltage is not included in the output voltage of the differential amplifier 611, and thus, the influence of variations of the threshold voltages of the amplification transistors 220 can be eliminated.

However, in the image sensor illustrated in FIG. 1, a problem of decreasing the light sensitivity occurs. In a case where the CDS is performed, an output corresponding to an optical signal and an output corresponding to the reset voltage of the photodiode are required. For this reason, a selection signal used for selecting a pixel, and a reset control signal used for resetting the photodiode are required. Such signal lines need to be provided for each pixel row, and a space used for laying the signal lines is necessary. In a case where such signal lines are laid, a fill factor that is a ratio of the area of a photodiode to the area of a pixel is decreased. As a result, the light sensitivity decreases. In addition, a drive circuit used for supplying a selection signal and a reset control signal is required for each pixel row, and the manufacturing cost of the image sensor is high.

In an image sensor including APS pixels, a method of performing a reset operation without using a signal dedicated for reset control is disclosed in FIG. 2 of Japanese Patent Application Laid-Open No. 10-108074. The method disclosed here is a method in which sensor resetting is used for a next selection signal. In this method, a dedicated reset wiring does not need to be laid, and the fill factor is not decreased.

SUMMARY

However, in this method, variations of the output signals occurring due to variations of the threshold voltages of the amplification transistors of pixels are not correctible. In order to correct the variations of the threshold voltages of the amplification transistors through the CDS, a difference between the following two outputs is necessary. One is an output at the time of inputting a signal to the amplification transistor, and the other one is an output at the time of inputting a reset voltage of the photodiode or a reference voltage to the amplification transistor. However, in the method disclosed here, a certain pixel is reset during a period in which a signal of another pixel is output. For this reason, the output at the time of inputting a reset voltage of the photodiode to the amplification transistor cannot be taken out. Accordingly, CDS correcting offset variations of the amplification transistors of pixels cannot be performed. Furthermore, the CDS mentioned in Japanese Patent Application Laid-Open No. 10-108074 is performed for an integrator but is not performed for the amplification transistors of pixels.

The image sensor according to the first aspect of the present invention includes a photoelectric conversion device, a first transistor, a second transistor, and a third transistor arranged in each of pixels partitioned by a plurality of signal lines and a plurality of row selection lines, the signal lines and the row selection lines being vertically and horizontally arranged. The photoelectric conversion device has a first terminal connected to a gate terminal of the first transistor and a second terminal connected to a first power supply line. The first transistor has a drain terminal connected to a second power supply line and a source terminal connected to a drain terminal of the second transistor. The second transistor has a gate terminal connected to the row selection line and a source terminal connected to the signal line. The third transistor has a gate terminal connected to the row selection line of an adjacent pixel row, a drain terminal connected to a third power supply line, and a source terminal connected to the first terminal of the photoelectric conversion device. A signal is applied to the row selection line over an active period that is longer than a period in which a signal corresponding to one pixel row is read from the signal line. The active period partly overlaps a period in which a signal is applied to an adjacent row selection line in time.

The image sensor according to the second aspect of the present invention further includes a capacitor having one end connected to the first terminal of the photoelectric conversion device and the other end connected to the gate terminal of the third transistor.

In the image sensor according to the third aspect of the present invention, in a period in which signals of all the pixels of the image sensor are read, the number of periods in which a signal is applied to the row selection line is one.

The image sensor according to the fourth aspect of the present invention further includes a signal processing circuit connected to one end of the signal line. The signal processing circuit outputs a difference between a voltage applied to the signal line during a period having an overlap in time with the active period and a voltage applied to the signal line during a period having no overlap in time with the active period.

In the image sensor according to the fifth aspect of the present invention, each of the first transistor, the second transistor, and the third transistor is an n-type transistor. The photoelectric conversion device is a photodiode. The first terminal is a cathode terminal of the photodiode. The second terminal is an anode terminal of the photodiode.

In the image sensor according to the sixth aspect of the present invention, a voltage applied to the first power supply line is lower than a voltage applied to the second power supply line.

It is to be understood that both the foregoing general description and the following detailed description are exemplary and explanatory and are not restrictive of the invention.

The above and further objects and features will more fully be apparent from the following detailed description with accompanying drawings.

DETAILED DESCRIPTION

Embodiment 1

Figure 1:
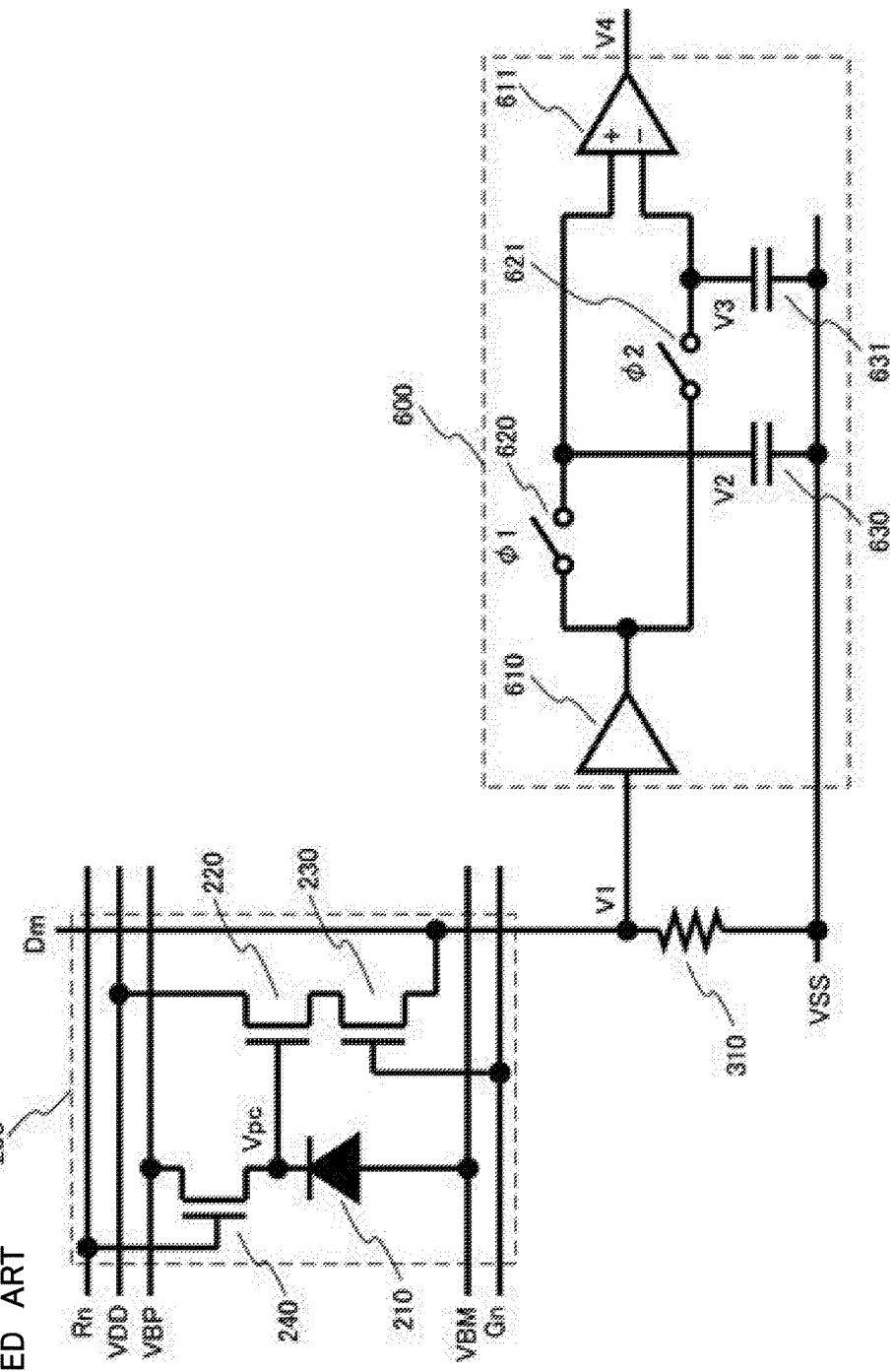
FIG. 1 is a circuit diagram that illustrates the configuration of a conventional image sensor.
Figure 2:
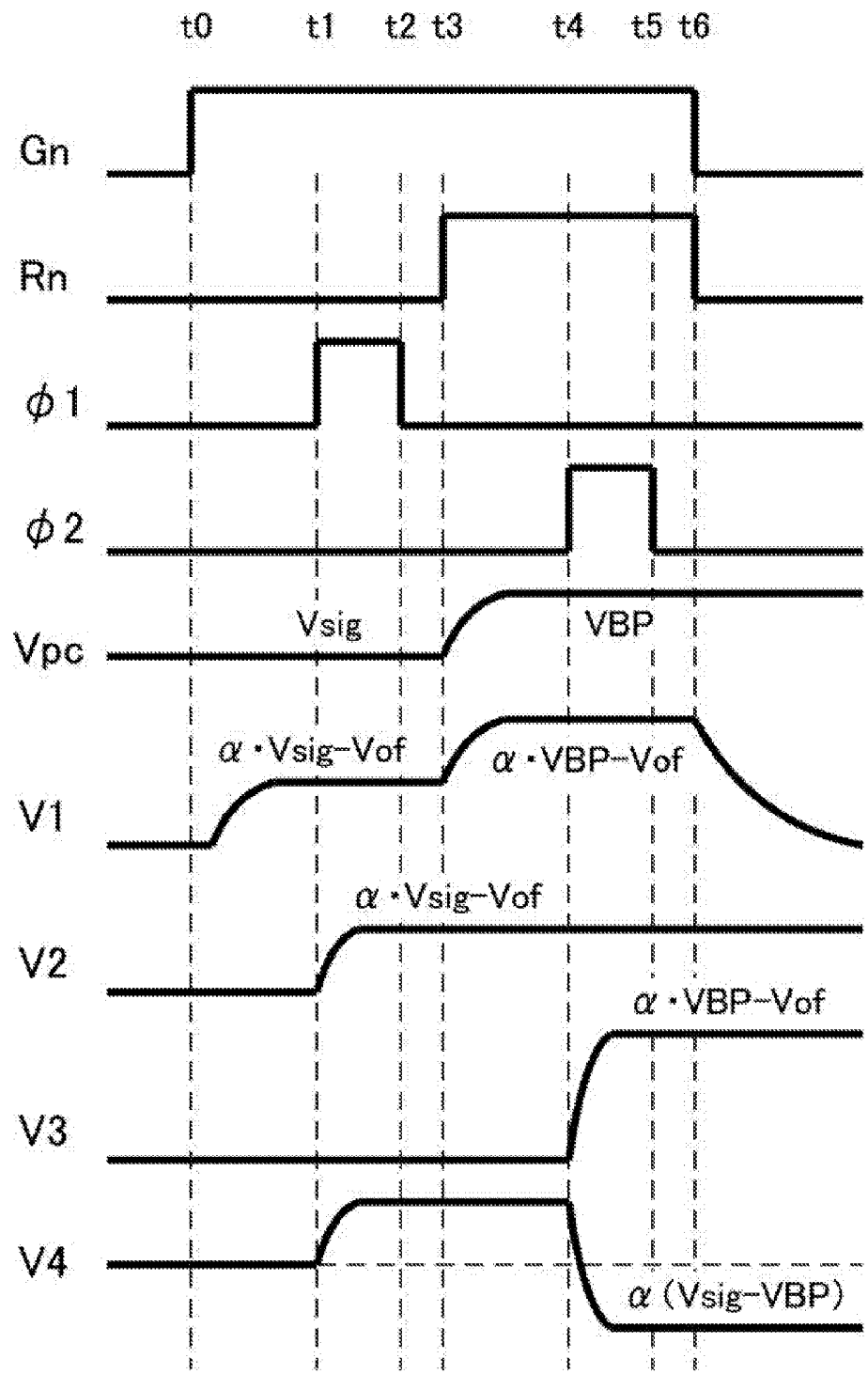
FIG. 2 is a timing diagram that illustrates the operation of a conventional image sensor.

An image sensor according to Embodiment 1 will be described in detail with reference to the drawings. In the drawings, the sizes and the scales of constituent elements are appropriately changed so as to secure visibility of the diagrams. In the drawings, hatching is used for discriminating the constituent elements from each other but does not necessarily represent a cross-section.

Figure 3:
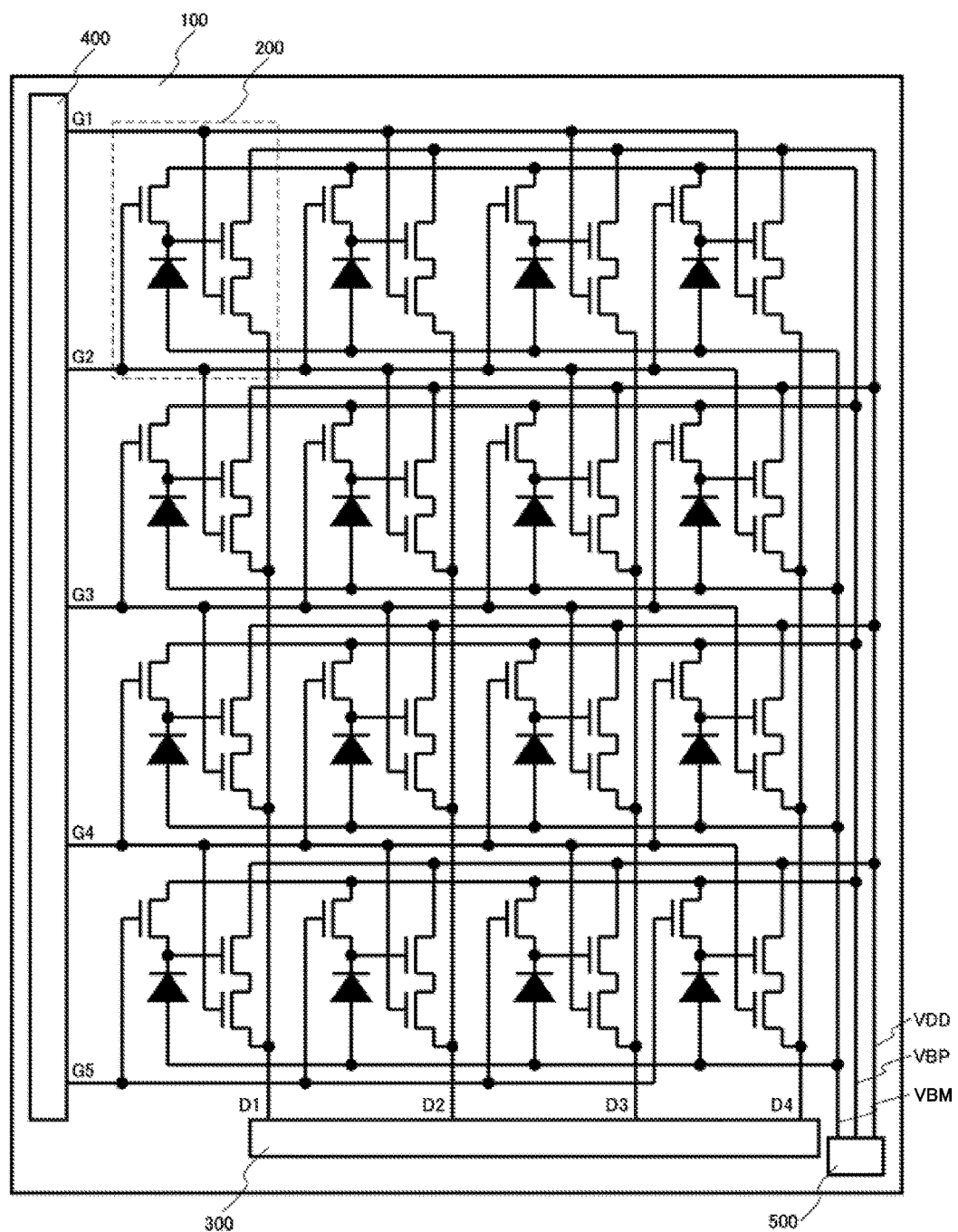
FIG. 3 is a block diagram that illustrates the configuration of an image sensor according to Embodiment 1.

FIG. 3 illustrates the configuration of the image sensor 100 according to Embodiment 1. The image sensor 100 includes: pixels 200 arranged in vertical and horizontal directions in a matrix pattern; signal lines D1 to D4 disposed for pixel columns respectively; and a detection circuit 300 connected to the signal lines D1 to D4. In addition, the image sensor 100 is configured by: row selection lines G1 to G5 disposed for pixel rows respectively; a drive circuit 400 that drives the row selection lines G1 to G5; and a power supply circuit 500 that supplies a voltage to each pixel 200. A power supply line VDD (second power supply line), a power supply line VBP (third power supply line), and a power supply line VBM (first power supply line) are connected to the power supply circuit 500, and each of the power supply lines VDD, VBP, and VBM outputs a voltage to the pixels 200. Hereinafter, the voltages of the power supply lines VDD, VBP, and VBM are also referred to as VDD, VBP, and VBM.

Figure 4:
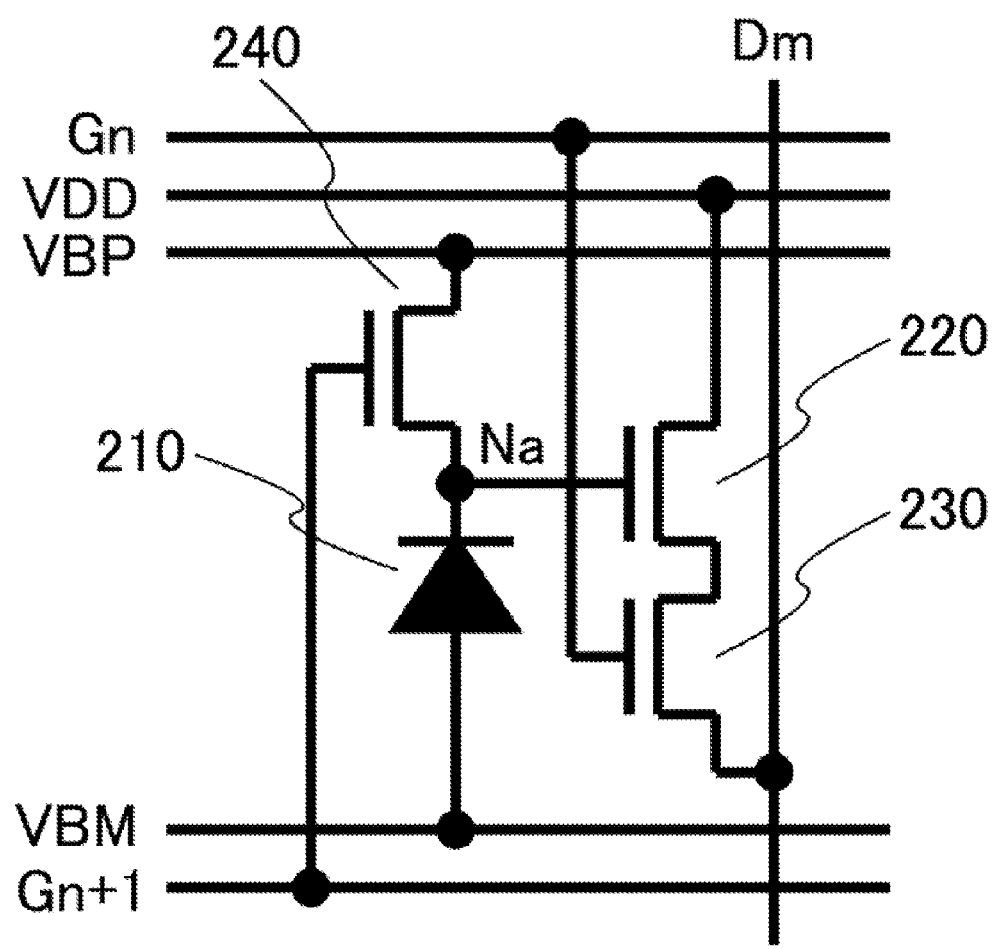
FIG. 4 is a circuit diagram that illustrates the configuration of a pixel of the image sensor according to Embodiment 1.

FIG. 4 illustrates an equivalent circuit of one pixel 200 of the image sensor 100 according to Embodiment 1. Since the configurations of the pixels 200 are similar to each other, unless otherwise mentioned, hereinafter, and a pixel 200 partitioned by a signal line Dm of an m-th column and a row selection line Gn of an n-th row will be described as a representative of the pixels 200. The pixel 200 is configured by: a photodiode (photoelectric conversion device) 210; an amplification transistor (first transistor) 220; a selection transistor (second transistor) 230; and a reset transistor (third transistor) 240. The amplification transistor 220, the selection transistor 230, and the reset transistor 240, for example, are n-type TFTs. The photodiode 210 has an anode connected to the power supply line VBM and a cathode connected to a gate terminal of the amplification transistor 220 and a source terminal of the reset transistor 240. The amplification transistor 220 has a drain terminal connected to the power supply line VDD and a source terminal connected to a drain terminal of the selection transistor 230. The selection transistor 230 has a gate terminal connected to a row selection line Gn and a source terminal connected to a signal line Dm. The reset transistor 240 has a drain terminal connected to the power supply line VBP and a gate terminal connected to a row selection line Gn+1. Here, the voltage VBP is set to a voltage higher than the voltage VBM, and a value of "VBP−VBM" is a reverse bias voltage of the photodiode 210. The voltage VDD is set to a voltage that is equal to the voltage VBP or higher than the voltage VBP. Accordingly, the voltage VBM is lower than the voltage VDD.

Figure 5:
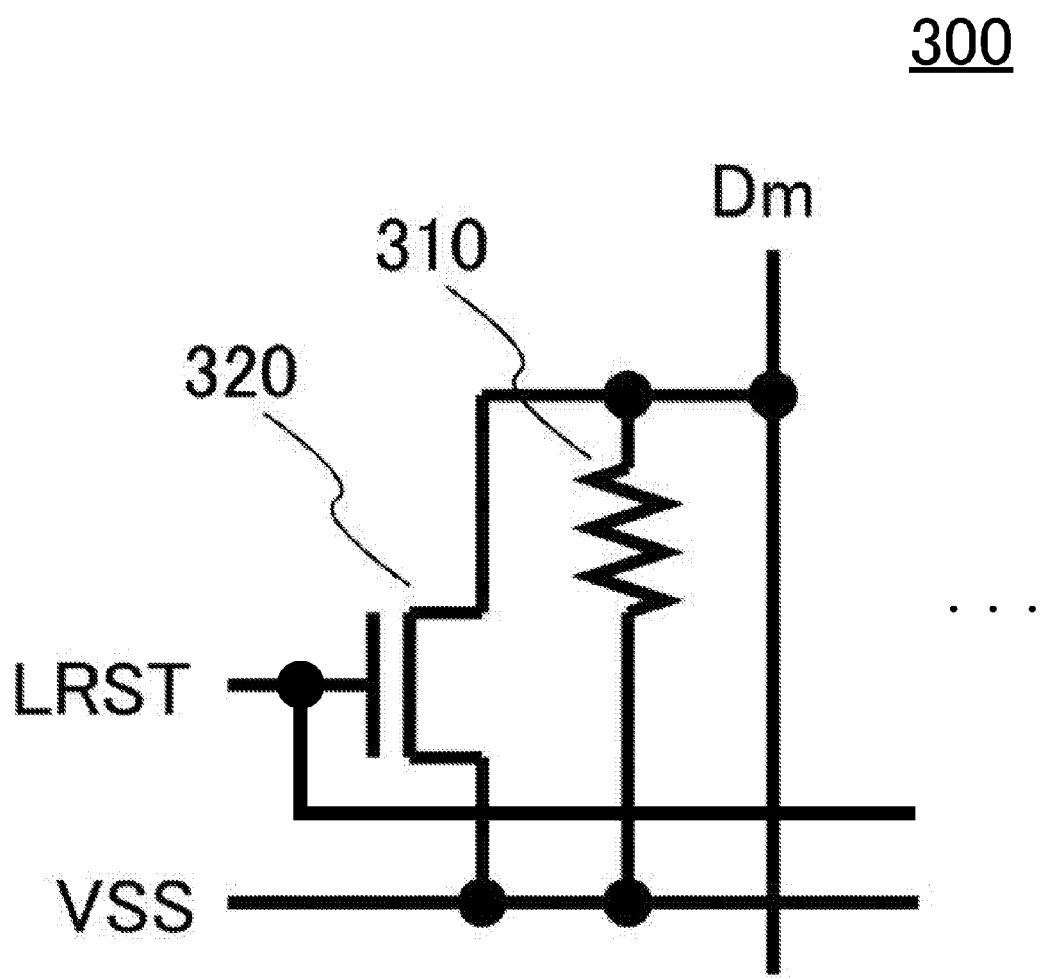
FIG. 5 is a circuit diagram of a detection circuit applicable to the image sensor according to Embodiment 1.

The detection circuit 300 of the image sensor 100 according to Embodiment 1 is configured by arranging detection sections connected to the signal lines D1 to D4 in an array pattern, and a circuit illustrated in a circuit diagram of FIG. 5 and the like may be used as the detection section. The detection section illustrated in FIG. 5 is connected to the signal line Dm and is configured by a load resistor 310 and a discharge transistor 320. The load resistor 310 has one end connected to the signal line Dm and the other end connected to the power supply line VSS. The discharge transistor 320 has a drain terminal connected to the signal line Dm, a source terminal connected to the power supply line VSS, and a gate terminal connected to a control line LRST. Hereinafter, the voltage of the power supply line VSS will be also referred to as VSS, and a signal applied to the control line LRST will be also referred to as LRST. Here, the resistance value of the load resistor 310 is set to a value as large as possible, more particularly, a value which realizes that time constant is at least 100 times or more of a period in which the selection transistor 230 of the pixel 200 is in the conductive state. The time constant described above is defined as the product of the parasitic capacitance of the signal line Dm and the resistance value of the load resistor 310. In addition, the voltage VSS is set to a voltage lower than the voltage VDD.

Figure 6:
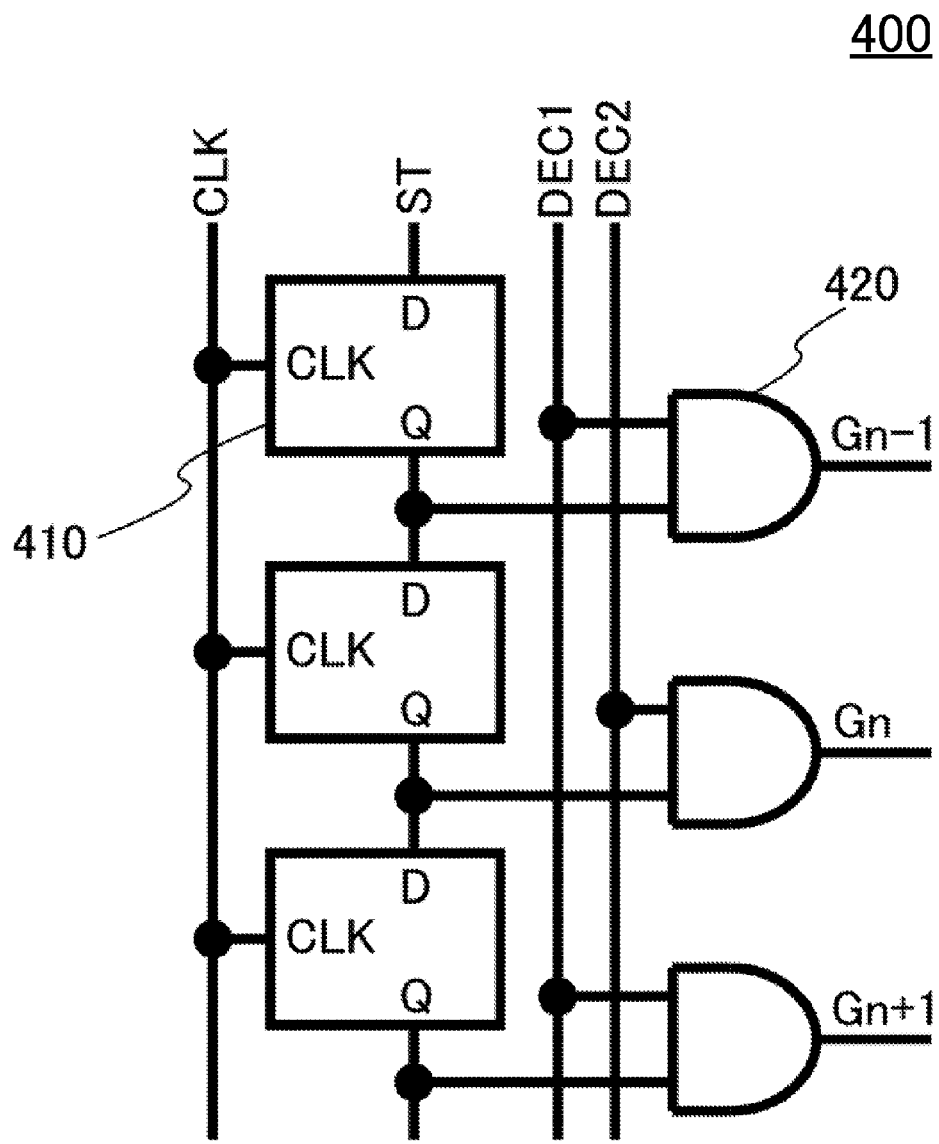
FIG. 6 is a circuit diagram of a drive circuit applicable to the image sensor according to Embodiment 1.

The drive circuit 400 of the image sensor 100 according to Embodiment 1 is a circuit having a function for outputting a pulse sequentially to the row selection lines G1 to G5. In the drive circuit 400, for example, as illustrated in FIG. 6, a circuit acquired by connecting D flip-flops (D-FFs) 410 in a column and connecting AND gates 420 to the output ends of the D-FFs 410 respectively may be used. The output of each D-FF 410 is input to the AND gate 420 corresponding thereto and is input to another D-FF 410 connected thereto. In addition, AND gates 420 are connected to the row selection lines G1 to G5 respectively and each AND gate 420 outputs a pulse to the row selection line corresponding thereto. To the AND gate 420 corresponding to each of odd row selection lines G1, G3, and G5, the output of the D-FF 410 corresponding thereto and a decoding signal DEC1 output from a control line DEC1 are input. To the AND gate 420 corresponding to each of even row selection lines G2 and G4, the output of the D-FF 410 corresponding thereto and a decoding signal DEC2 transmitted from a control line DEC2 are input. The drive circuit 400 configured in this way operates so as to output a pulse sequentially to the row selection lines G1 to G5. The operation of the drive circuit 400 will be described later.

Figure 7:
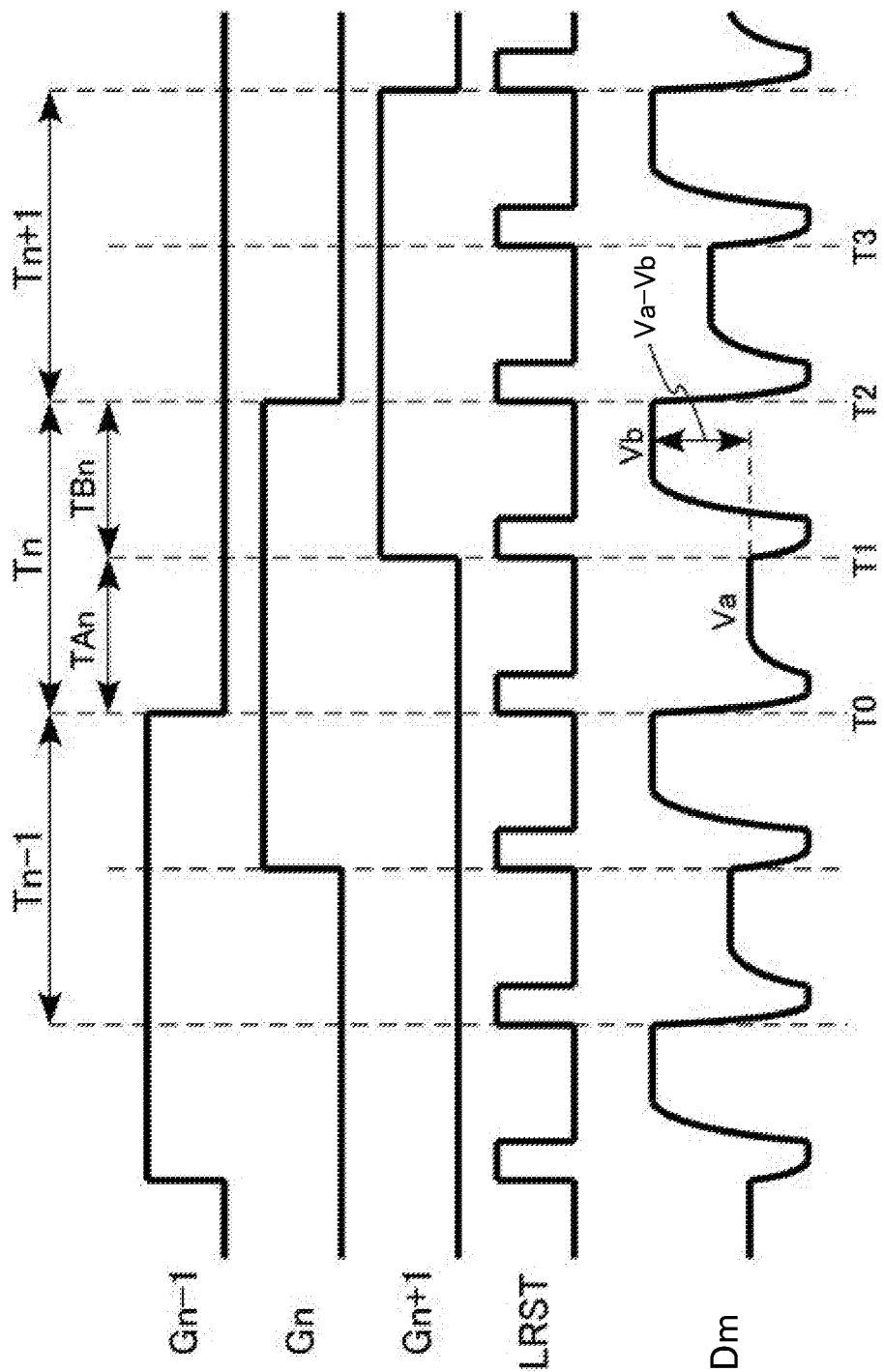
FIG. 7 is a timing diagram that illustrates a method of driving the image sensor according to Embodiment 1.

Next, the operation of the image sensor 100 according to Embodiment 1 will be described using a timing diagram illustrated in FIG. 7. The image sensor 100 according to Embodiment 1 performs an operation of reading signals of the pixels 200 in units of pixel rows of the horizontal direction. In FIG. 7, a period Tn is a period in which signals of a pixel row of the n-th row are read. The gate terminals of the selection transistors 230 included in the pixels 200 disposed in the pixel row of the n-th row are connected to the row selection line Gn. During the period Tn, since the row selection line Gn is in the high level, the selection transistor 230 is in the conductive state. At time T0, a control signal LRST of the detection section becomes the high level, and the electric potential of each of the signal lines D1 to D4 is reset to VSS. After the control signal LRST changes to the low level during a period TAn, a signal voltage maintained at the photodiode 210 of each pixel 200 disposed in the n-th row is output to a corresponding signal line among the signal lines D1 to D4 through the amplification transistor 220. The voltage of the signal line Dm at this time is assumed to be a voltage Va. At time T1 that is the start of a period TBn, the control signal LRST becomes the high level, and the electric potential of each of the signal lines D1 to D4 is reset to VSS. In addition, the row selection line Gn+1 disposed in the (n+1)-th row becomes the high level as well. Since the gate of the reset transistor 240 of each pixel 200 disposed in the n-th row is connected to the row selection line Gn+1, the cathode voltage of the photodiode 210 of each pixel 200 disposed in the n-th row is reset to the voltage VBP. Then, after the control signal LRST changes to the low level, voltages at the time of inputting the voltage VBP to the gates of the amplification transistors 220 of the pixels 200 disposed in the n-th row are respectively output to the signal lines D1 to D4. A voltage of the signal line Dm at this time is assumed to be Vb.

During the period TBn, both the row selection lines Gn and Gn+1 are in the high level. For this reason, the selection transistors 230 disposed in the pixel rows of the n-th row and the (n+1)-th row are in the conductive state. However, a voltage corresponding to VBP that is the cathode voltage of the photodiode 210 disposed in the n-th row is output to the signal line Dm. The reason will be described as below.

In a case where light is emitted to the photodiode 210, the cathode voltage of the photodiode 210 is lower than VBP in correspondence with the amount of the emitted light. Also in a case where light is not emitted, a leak current flows between the cathode and the anode of the photodiode 210, and thus, the cathode voltage is lower than VBP. In addition, an n-type transistor is used as the reset transistor 240. For this reason, as a resetting operation ends and the gate voltage decreases, a feedthrough occurs through parasitic capacitance between the source and the gate of the reset transistor 240, and the cathode voltage of the photodiode 210 decreases. Thus, during the period TBn, the cathode voltage of the photodiode 210 of the pixel 200 disposed in the n-th row is higher than the cathode voltage of the photodiode 210 of the pixel 200 disposed in the (n+1)-th row.

Meanwhile, in a case where the amplification transistor 220 of the pixel 200 is the n-type, the amplification transistor 220 can raise the electric potential of the connected signal line Dm but cannot lower the electric potential of the connected signal line Dm. In addition, the value of the time constant that is determined based on the resistance value of the load resistor 310 connected to the signal line Dm and the parasitic capacitance of the signal line Dm is set to 100 times of the period Tn or more. For this reason, during the period Tn, the electric potential of the signal line Dm scarcely decreases. It is assumed that the time constant determined based on the parasitic capacitance of the signal line Dm and the resistance of the load resistor 310 is 100 times Tn, and an electric potential of the source terminal of the amplification transistor 220 reaches an output voltage corresponding to an input so that the amplification transistor 220 is in a state regarded as an off state. In this case, during the period Tn, a voltage variation rate of the signal line Dm varying according to a current flowing through the load resistor 310 is 1% or less. For this reason, during the period TBn, out of the cathode voltage of the photodiode 210 of the pixel 200 disposed in the n-th row and the cathode voltage of the photodiode 210 of the pixel 200 disposed in the (n+1)-th row, a voltage depending on the cathode voltage of the pixel 200 disposed in the n-th row having a higher voltage is output to the signal line Dm through the amplification transistor 220 of the pixel 200 disposed in the n-th row.

The amplification transistor 220 and the selection transistor 230 disposed inside the pixel 200 and the load resistor 310 connected to the signal line Dm forms a source follower circuit. In a case where the on-resistance of the selection transistor 230 is sufficiently small, and the value of the load resistor 310 is sufficiently large, when a voltage VG is applied to the gate of the amplification transistor 220, the voltage of the signal line Dm is represented in the following Equation (1).

$$\alpha \times VG < Vof \quad (1)$$

Here, $\alpha$ is the voltage amplification factor of the source follower circuit and has a value of one or less. In addition, Vof is an offset voltage and is a value depending on the threshold voltage of the amplification transistor 220. In a case where the cathode voltage of the photodiode 210 of the pixel 200 disposed in the n-th row during the period TAn is denoted by Vs, the voltage Va described above is represented in the following Equation (2).

$$Va = \alpha \times Vs - Vof \quad (2)$$

Similarly, the voltage Vb is represented in the following Equation (3).

$$Vb = \alpha \times VBP - Vof \quad (3)$$

Thus, the offset voltage Vof depending on the threshold voltage of the amplification transistor 220 can be eliminated by taking a difference between the voltages Va and Vb through a CDS operation.

Figure 8:
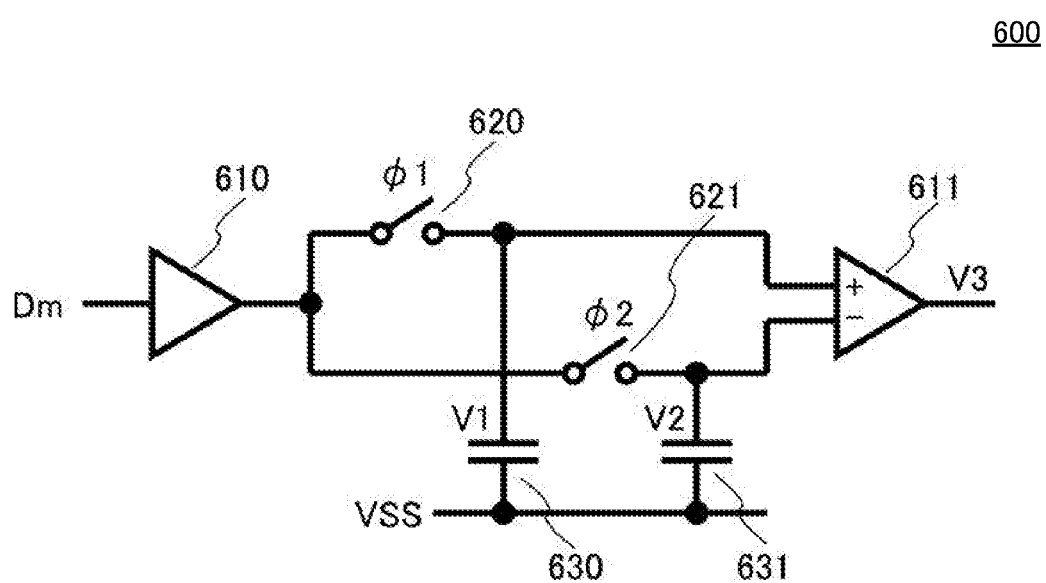
FIG. 8 is a circuit diagram of a signal processing circuit applicable to the image sensor according to Embodiment 1.
Figure 9:
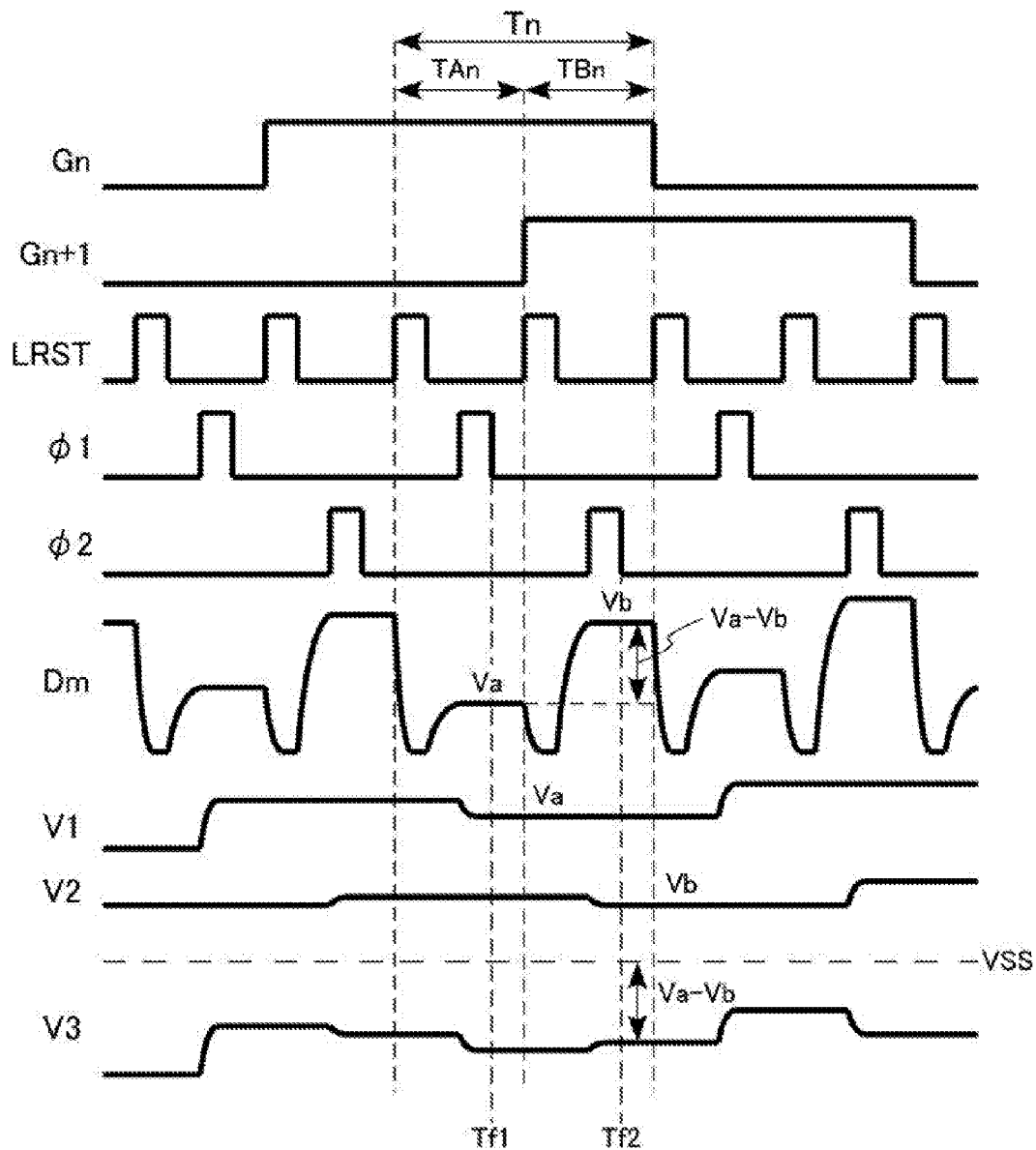
FIG. 9 is a timing diagram that illustrates a method of driving the image sensor according to Embodiment 1.

An example of the signal processing circuit 600 realizing the CDS operation is illustrated in FIG. 8. This signal processing circuit 600 is configured by: an initial-stage amplifier 610; a differential amplifier 611; two switches 620 and 621; and two capacitors 630 and 631. The switch 620 is controlled using a control signal $\phi1$, and the switch 621 is controlled using a control signal $\phi2$. An input terminal of the initial-stage amplifier 610 is connected to the signal line Dm. It is preferable that the input impedance of the initial-stage amplifier 610 is set to be high. FIG. 9 is a timing diagram that illustrates an operation. Hereinafter, for the convenience of description, a case will be described in which the voltage amplification gain of each of the initial-stage amplifier 610 and the differential amplifier 611 is one. Such a voltage amplification gain may be a value other than one. The voltage Va is maintained at the capacitor 630 by outputting the control signal 91 such that the switch 620 is in the off state at time Tf1. In addition, the voltage Vb is maintained at the capacitor 631 by outputting the control signal $\phi2$ such that the switch 621 is in the off state at time Tf2. "Va−Vb" that is a difference between the voltage maintained at the capacitor 630 and the voltage maintained at the capacitor 631 is output from the differential amplifier 611.

Figure 10:
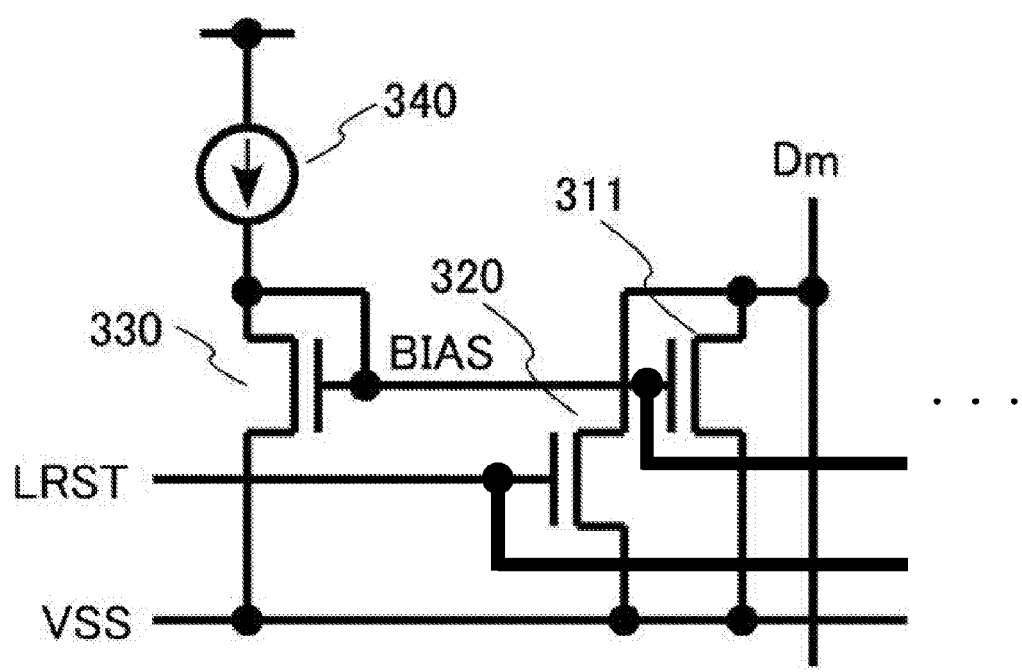
FIG. 10 is a circuit diagram of a detection circuit applicable to the image sensor according to Embodiment 1.
Figure 11:
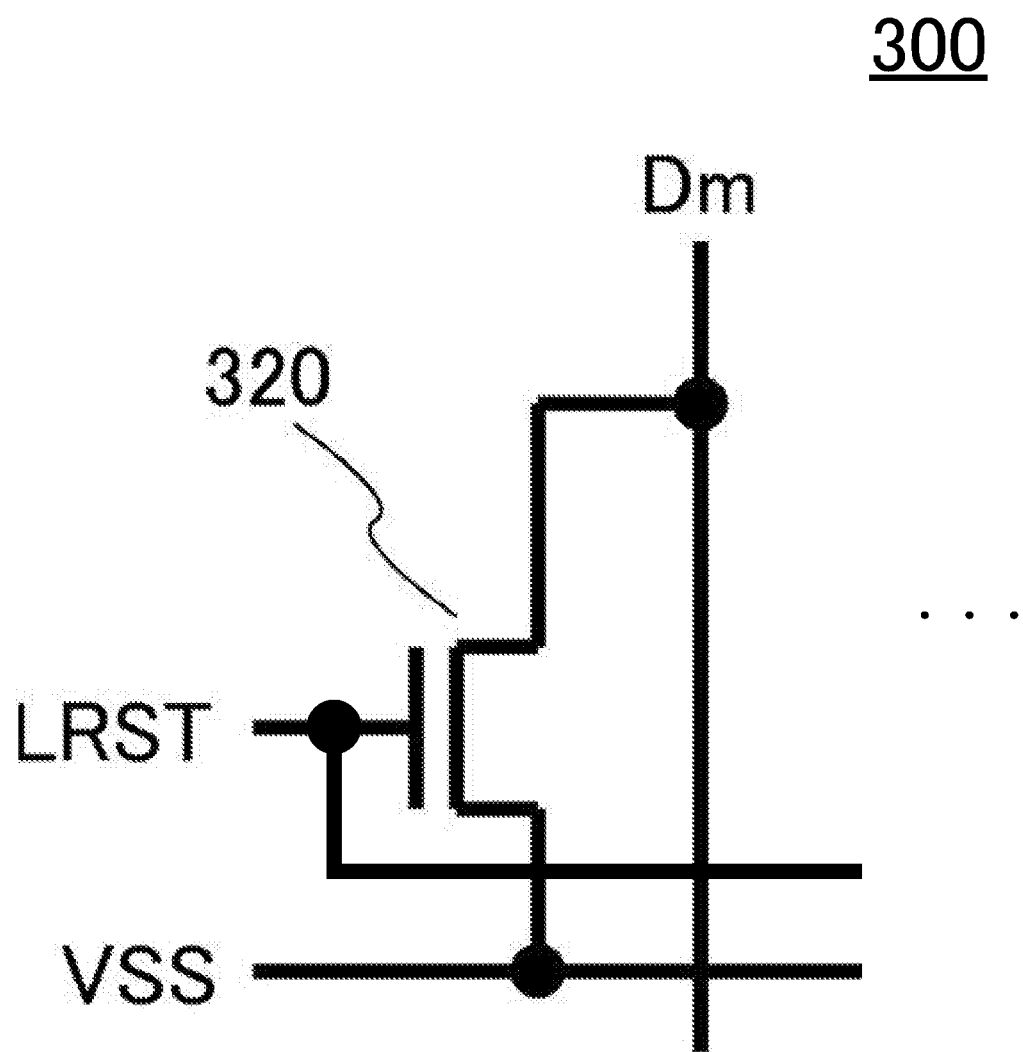
FIG. 11 is a circuit diagram of a detection circuit applicable to the image sensor according to Embodiment 1.

Up to here, as an example of the image sensor 100 according to Embodiment 1, an image sensor in which pixels 200 are arranged in a matrix pattern of four columns and four rows in the vertical and horizontal directions has been illustrated. It is apparent that the number of pixel columns, the number of pixel rows, and a total number of pixels may be freely changed according to the purpose. As the load resistor 310 of the detection circuit applicable to the image sensor 100 according to Embodiment 1, an active load represented in FIG. 10 may be used. In FIG. 10, a transistor 311 used for the active load is illustrated, a transistor 330 supplies a bias voltage to the transistor used for the active load, and a reference current source 340 is illustrated. In addition, the active load may be configured only by the discharge transistor 320 as illustrated in FIG. 11.

Figure 12:
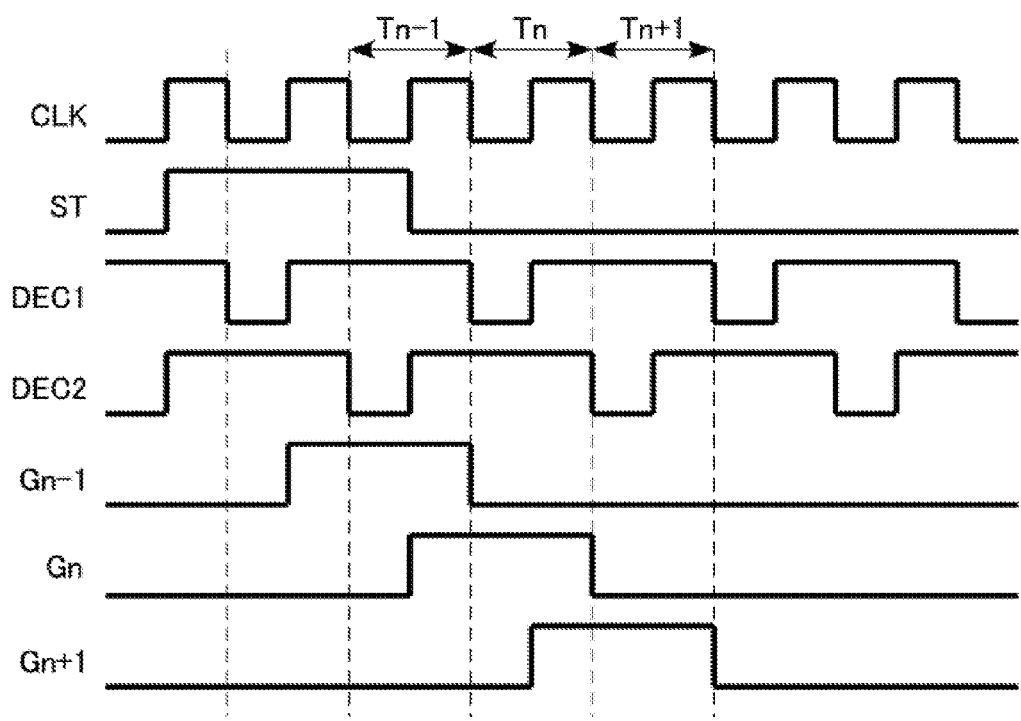
FIG. 12 is a timing diagram that illustrates the operation of a drive circuit applicable to the image sensor according to Embodiment 1.

Here, as a drive circuit applicable to the image sensor 100 according to Embodiment 1, the drive circuit 400 illustrated in FIG. 6 may be used. The drive circuit 400 may be operated according to a timing diagram illustrated in FIG. 12. The D-FF 410 is driven using a clock having the same cycle as the period Tn in which signals of one row of the image sensor 100 are detected. A decoding signal DEC1 input to the AND gates 420 connected to the output ends of the D-FFs 410 of odd stages and a decoding signal DEC2 input to the AND gates 420 connected to the output ends of the D-FFs 410 of even stages have a high-level period of a length that is 3/2 times of Tn, and the phase of the pulse of the decoding signal DEC1 is different from the phase of the pulse of the decoding signal DEC2. In a case where the drive circuit 400 is operated using such control signals, signals of row selection lines Gn−1, Gn, and Gn+1 as illustrated in FIG. 7 are acquired.

According to the image sensor 100 according to Embodiment 1, variations of the initial characteristics of the amplification transistor 220 and variations of the characteristics thereof according to degradation with time can be compensated without decreasing the light sensitivity and increasing the manufacturing cost. The reasons will be described below.

In the image sensor 100 according to Embodiment 1, since resetting control is performed using a selection signal of an adjacent pixel row without using a control signal dedicated for the resetting control of the photodiode 210, the number of wirings arranged for each pixel row can be decreased. For this reason, the area of the photodiode 210 arranged inside the partition of the pixel 200 is not decreased. Accordingly, the light sensitivity is not decreased.

In the image sensor 100 according to Embodiment 1, although a selection signal of an adjacent pixel row is used as the resetting control of the photodiode 210, the voltage after resetting the photodiode 210 can be read through the amplification transistor 220 of the pixel 200. Accordingly, a so-called CDS operation detecting a difference between a voltage including a signal and a voltage after resetting can be performed, and variations of threshold voltages due to the initial characteristics of the amplification transistors 220 and to degradation with time can be compensated.

In the image sensor 100 according to Embodiment 1, a simple pulse waveform can be used as a selection signal. The simple pulse waveform described here is not a complicated pulse waveform in which a change to the high level or the low level is made a plurality of times within a period that is about several times of the period Tn but a simple pulse waveform in which a change to the high level is made only once within one frame period in which signals of all the pixels 200 of the image sensor 100 are read. For this reason, a simplified circuit can be used as a drive circuit so that the manufacturing cost is not high. In addition, since only a selection signal is necessary as the control signal, a drive circuit that separately supplies a reset signal as in a conventional case is not necessary so that the manufacturing cost can be decreased.

Embodiment 2

Figure 13:
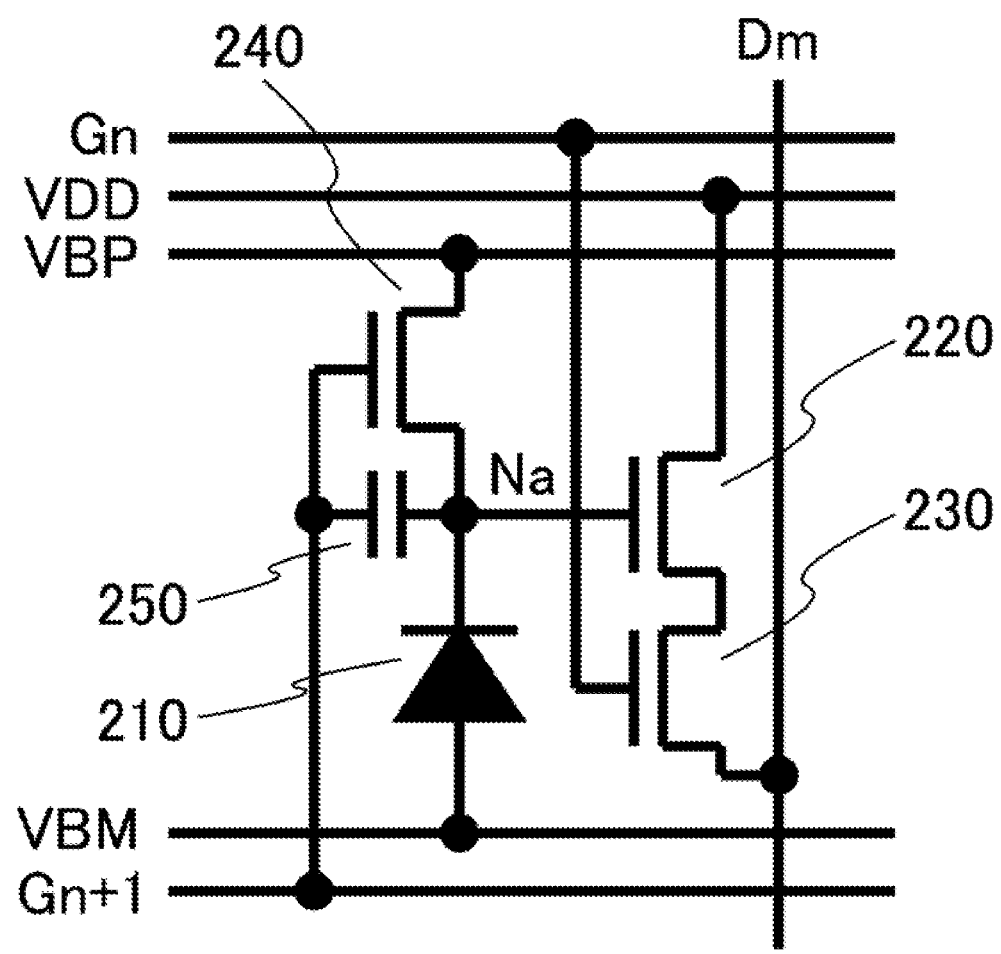
FIG. 13 is a circuit diagram that illustrates the configuration of a pixel of an image sensor according to Embodiment 2.

FIG. 13 is a circuit diagram that illustrates the configuration of a pixel 200 of an image sensor 100 according to Embodiment 2. The whole configuration of the image sensor 100 according to Embodiment 2 is the same as that of the image sensor 100 according to Embodiment 1 illustrated in FIG. 3, and only the configuration of the pixel 200 is different from that of the image sensor 100 according to Embodiment 1.

The pixel 200 of the image sensor 100 according to Embodiment 2 is configured by: a photodiode 210; an amplification transistor 220; a selection transistor 230; a reset transistor 240; and a correction capacitor 250. The photodiode 210 has an anode connected to a power supply line VBM and a cathode connected to a gate terminal of the amplification transistor 220 and to a source terminal of the reset transistor 240. The amplification transistor 220 has a drain terminal connected to a power supply line VDD and a source terminal connected to a drain terminal of the selection transistor 230. The selection transistor 230 has a gate terminal connected to a row selection line Gn and a source terminal connected to a signal line Dm. The reset transistor 240 has a drain terminal connected to a power supply line VBP and a gate terminal connected to a row selection line Gn+1. The correction capacitor 250 has one end connected to the cathode of the photodiode 210 and the other end connected to the row selection line Gn+1. The setting of the voltages VBP and VBM is performed similarly to Embodiment 1. In addition, as a detection circuit 300, a drive circuit 400, and a power supply circuit 500 of the image sensor 100 according to Embodiment 2, circuits configured similar those of Embodiment 1 may be used. As a signal processing circuit used for performing a CDS operation, a circuit configured similar to that of Embodiment 1 may be used.

The operation of the image sensor 100 according to Embodiment 2 may be performed using a method similar to the operation method represented in Embodiment 1.

According to the image sensor 100 according to Embodiment 2, similar to the image sensor 100 according to Embodiment 1, variations of the threshold voltage due to initial characteristics of the amplification transistor 220 and variations of the threshold voltage due to degradation with time can be compensated without decreasing the light sensitivity and increasing the manufacturing cost. In addition, the image sensor 100 according to Embodiment 2 can realize the larger magnitude of variations of the threshold voltage of the amplification transistor 220, which can be compensated, than that of the image sensor 100 according to Embodiment 1. The reasons will be described below.

In the image sensor 100 according to Embodiment 2, the reason for being capable of compensating variations of the threshold voltage due to the initial characteristics of the amplification transistor 220 and to the degradation with time without decreasing the light sensitivity and increasing the manufacturing cost is the same as that for acquiring the same effect in the image sensor 100 according to Embodiment 1.

Next, the reason why the magnitude of variations of the threshold voltage of the amplification transistor 220 that can be compensated in the image sensor 100 according to Embodiment 2 is larger than that in the image sensor 100 according to Embodiment 1 will be described. As presented in the description of the image sensor 100 according to Embodiment 1, during the period in which the photodiode 210 disposed in the pixel row of the n-th row of the image sensor 100 is reset, the selection transistor 230 disposed in the pixel row of the (n+1)-th row is in the conductive state. In other words, during this period, all the selection transistors 230 disposed in the pixel rows of the n-th row and the (n+1)-th row are in the conductive state. During this period, when a signal corresponding to a reset voltage of the photodiode 210 disposed in the pixel row of the n-th row is output to the signal line Dm, a CDS operation can be performed, and the variations of the characteristics of the amplification transistor 220 are compensated. A required condition for realizing this operation is that a condition of the following Equation (4) is satisfied during the period described above.

$$VNa(n)-(Vth+\Delta Vth(n))>VNa(n+1)-(Vth+\Delta Vth(n+1)) \quad (4)$$

Here, Vth is a threshold voltage of the amplification transistor 220 that is prescribed in advance. VNa(n) is the cathode voltage of the photodiode 210 of the pixel 200 disposed in the pixel row of the n-th row. ΔVth(n) is a difference between Vth and the threshold voltage of the amplification transistor 220 of the pixel 200. In other words, ΔVth(n) indicates an error from Vth, included in the threshold voltage of the amplification transistor 220 disposed in the pixel 200 of the n-th row. Similarly, VNa(n+1) is the cathode voltage of the photodiode 210 of the pixel 200 disposed in the pixel row of the (n+1)-th row. ΔVth(n+1) is a difference between Vth and the threshold voltage of the amplification transistor 220 of the pixel 200. In other words, ΔVth(n+1) indicates an error from Vth, included in the threshold voltage of the amplification transistor 220 disposed in the pixel 200 of the (n+1)-th row.

As presented in the description of Embodiment 1, in a case where VNa(n) and VNa(n+1) are compared with each other, VNa(n+1) is necessarily lower than VNa(n). However, one of ΔVth(n) and ΔVth(n+1) which is higher is not determined. Since the amplification transistors 220 are manufactured to have the same size in all the pixels 200, the threshold voltages Vth of all the pixels 200 should be the same. However, the threshold voltage varies due to initial characteristics such as variations in the shape at the time of manufacturing, variations in the film thickness, or the like and also varies due to degradation with time. For this reason, actually, the threshold voltages of the amplification transistors 220 of the pixels 200 are different from each other. Here, for the amplification transistors 220 of all the pixels 200 of the image sensor 100, in a case where a maximum value of a difference from Vth is ΔVth(MAX), a minimum value of the difference from Vth is ΔVth(MIN), and a difference ΔVth(MAX)−ΔVth(MIN) thereof is ΔVth(RNG), when the following Equation (5) is satisfied, Equation (4) is constantly satisfied.

$$VNa(n)-VNa(n+1)>\Delta Vth(RNG) \quad (5)$$

In the period that is currently discussed, VNa(n) is a reset voltage of the photodiode 210, and VNa(n+1) is a voltage of the photodiode 210 before reset. VNa(n+1) is highest in a case where light is not emitted. In a case where light is not emitted, VNa(n+1) depends on the magnitude of the leak current of the photodiode 210. In addition, since parasitic capacitance between the source and the gate of the reset transistor 240 is small, a decrease in the cathode voltage according to feedthrough is not large. For this reason, in a case where ΔVth(RNG) is large, there is a possibility that Equation (5) is not satisfied. In the image sensor 100 according to Embodiment 2, one terminal of the correction capacitor 250 is connected to the cathode of the photodiode 210, and the other one terminal of the correction capacitor 250 is connected to the row selection line Gn+1, that is, to the gate of the reset transistor 240. For this reason, after the reset of the cathode voltage of the photodiode 210 ends, in a case where the electric potential of the row selection line Gn+1 changes to the low level, the cathode voltage of the photodiode 210 varies in a decreasing direction through the correction capacitor 250. In the case where the electric potential of the row selection line Gn+1 changes from the high level to the low level, a variation amount of the electric potential of a node Na is represented in the following Equation (6).

$$\Delta V = -\frac{Cf}{Cf + Cpd + Cp} \times \Delta Vrst \qquad (6)$$

Here, Cf is the capacitance value of the correction capacitor 250, Cpd is the value of the equivalent capacitance of the photodiode 210, and Cp is the value of the other parasitic capacitance of the node Na of the cathode of the photodiode 210. ΔVrst is a wave crest value of a pulse supplied to the row selection line Gn+1, that is, a difference value between a value at the time of the high level of the electric potential of Gn+1 and a value at the time of the low level of the electric potential of Gn+1. Thus, in Equation (5), the value of VNa(n+1) can be decreased by the absolute value of ΔV. For this reason, Equation (5) is constantly satisfied by setting the value of Cf such that the absolute value of the variation voltage ΔV of the cathode voltage represented in Equation (6) is larger than ΔVth(RNG). Since Equation (5) is constantly satisfied, Equation (4) is constantly satisfied. A specific method for setting the value of Cf can be realized using the following method. First, ΔVth(RNG) is estimated based on a statistic of the variations of the threshold voltage of the amplification transistor 220 at the time of manufacturing and a variation amount of the threshold of the amplification transistor 220 estimated from the use condition of the image sensor 100. Next, the value of Cf is set such that the absolute value of ΔV represented in Equation (6) is larger than the estimated ΔVth(RNG). As described above, even if the variation of the threshold voltage of the amplification transistor 220 is large, the CDS operation can be necessarily realized by changing the value of Cf in accordance with the variation. For this reason, the magnitude of the variation of the threshold voltage that can be corrected can be further increased.

According to these embodiments, variations of the threshold voltage due to the initial characteristics of the amplification transistor and variations of the threshold voltage due to degradation with time can be compensated without decreasing the light sensitivity of the image sensor and increasing the manufacturing cost.

Figure 14:
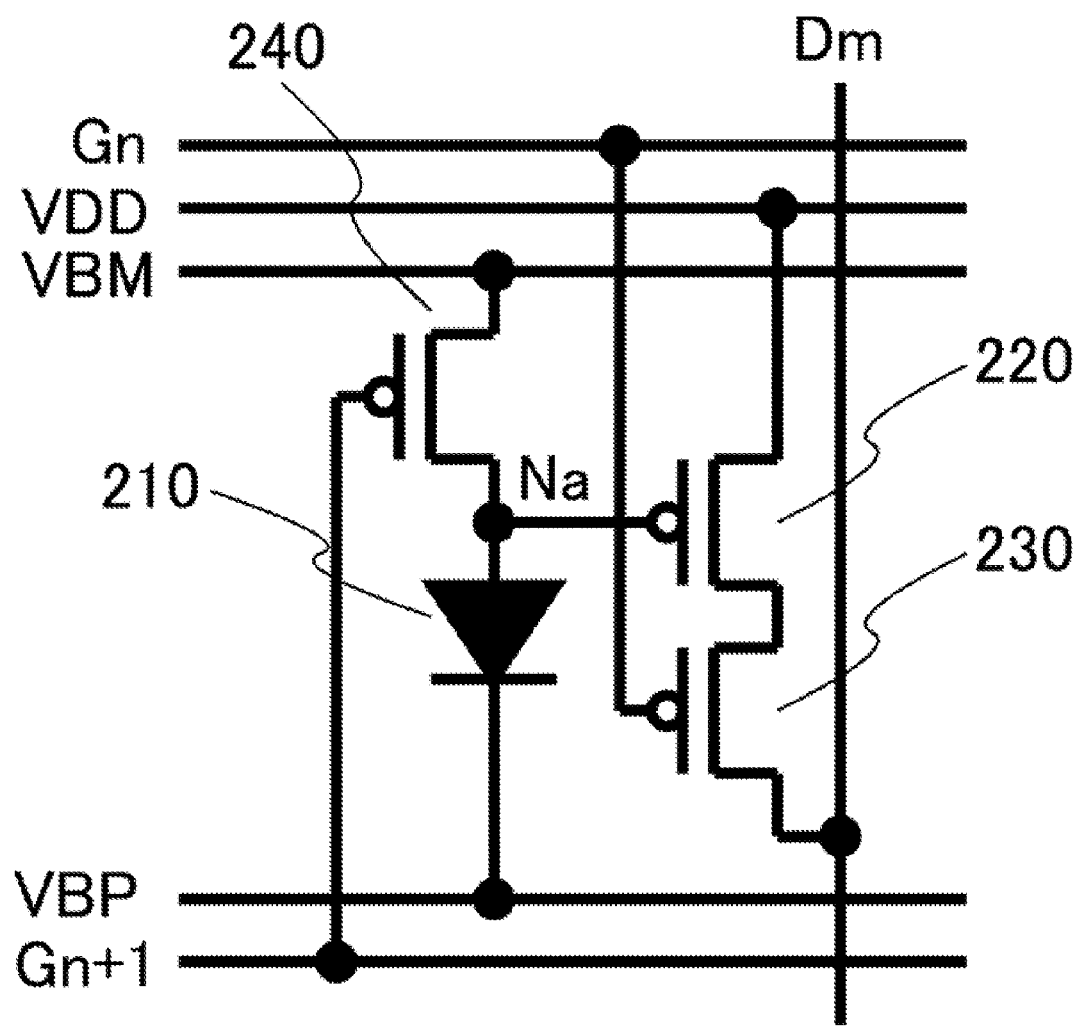
FIG. 14 is a circuit diagram that illustrates the configuration of a pixel of the image sensor according to Embodiments 1 and 2.

Up to here, while the n-type transistor has been described as a transistor applicable to the image sensors 100 according to Embodiments 1 and 2, it is apparent that a p-type transistor may be used. In such a case, the image sensor can be realized by changing the connection of the photodiode 210 as illustrated in FIG. 14, reversing the polarities of various control signals, and changing the voltage supplied to the drain terminal of the amplification transistor 220 appropriately.

In addition, while an example has been illustrated in which the photodiode 210 is used as the photoelectric conversion device of the image sensor 100, a photoconductive layer including ZnO, CdS, CdSe, or the like may be used as the photoelectric conversion device of the image sensor 100.

Furthermore, as a transistor applicable to the image sensor 100 according to each of Embodiments 1 and 2, there is a polycrystalline Si-TFT, an a-Si TFT, an oxide semiconductor TFT, or an organic transistor represented by pentacene or the like. Particularly, it is preferable that the oxide semiconductor TFT is used owing to a small variation in the threshold voltage at the time of manufacturing and a relatively high mobility.

It is noted that, as used herein and in the appended claims, the singular forms "a", "an", and "the" include plural referents unless the context clearly dictates otherwise.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image sensor, comprising:
   a photoelectric conversion device, a first transistor, a second transistor, and a third transistor arranged in each of pixels partitioned by a plurality of signal lines and a plurality of row selection lines, the signal lines and the row selection lines being vertically and horizontally arranged,
   wherein the photoelectric conversion device has a first terminal connected to a gate terminal of the first transistor and a second terminal connected to a first power supply line,
   wherein the first transistor has a drain terminal connected to a second power supply line and a source terminal connected to a drain terminal of the second transistor,
   wherein the second transistor has a gate terminal connected to the row selection line and a source terminal connected to the signal line,
   wherein the third transistor has a gate terminal connected to the row selection line of an adjacent pixel row, a drain terminal connected to a third power supply line, and a source terminal connected to the first terminal of the photoelectric conversion device,
   wherein a signal is applied to the row selection line over an active period that is longer than a period in which a signal corresponding to one pixel row is read from the signal line, and
   wherein the active period partly overlaps a period in which a signal is applied to an adjacent row selection line in time.

2. The image sensor according to claim 1, further comprising:
   a capacitor having one end connected to the first terminal of the photoelectric conversion device and the other end connected to the gate terminal of the third transistor.

3. The image sensor according to claim 1,
   wherein, in a period in which signals of all the pixels are read, the number of periods in which a signal is applied to the row selection line is one.

4. The image sensor according to claim 1, further comprising:
   a signal processing circuit connected to one end of the signal line,
   wherein the signal processing circuit outputs a difference between a voltage applied to the signal line during a period having an overlap in time with the active period and a voltage applied to the signal line during a period having no overlap in time with the active period.

5. The image sensor according to claim 1,
   wherein each of the first transistor, the second transistor, and the third transistor is an n-type transistor, wherein the photoelectric conversion device is a photodiode, and wherein the first terminal is a cathode terminal of the photodiode, and the second terminal is an anode terminal of the photodiode.

6. The image sensor according to claim 5, wherein a voltage applied to the first power supply line is lower than a voltage applied to the second power supply line.

* * * * *